US009903396B2

(12) United States Patent
Brinkman

(10) Patent No.: US 9,903,396 B2
(45) Date of Patent: Feb. 27, 2018

(54) VALVE ASSEMBLY

(71) Applicant: Caterpillar Inc., Peoria, IL (US)

(72) Inventor: Jason Lee Brinkman, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/063,658

(22) Filed: Mar. 8, 2016

(65) Prior Publication Data

US 2017/0261011 A1 Sep. 14, 2017

(51) Int. Cl.
*F16K 11/06* (2006.01)
*F15B 13/08* (2006.01)
*F15B 13/042* (2006.01)

(52) U.S. Cl.
CPC ...... *F15B 13/0832* (2013.01); *F15B 13/0426* (2013.01)

(58) Field of Classification Search
CPC ............. F15B 13/0832; F15B 13/0426; Y10T 137/87193; Y10T 137/87225
USPC .................... 137/596.18, 596.14, 487.5, 102
See application file for complete search history.

(56) References Cited

U.S. PATENT DOCUMENTS 3,139,109 A * 6/1964 Ruchser ................ F15B 20/001 137/596.16
3,722,541 A 3/1973 Wilke
4,117,862 A 10/1978 Qureshi
4,473,095 A * 9/1984 Motzer ................ F15B 20/001 137/596.16
4,503,886 A * 3/1985 Simpson, Jr. ........... F15B 13/04 137/596
4,520,841 A 6/1985 Brand et al.
4,619,187 A * 10/1986 Blake .................... F16D 48/062 137/596.16
4,763,691 A * 8/1988 Hahmann ........... F15B 13/0402 137/596.14
4,903,727 A * 2/1990 Motzer ................. F15B 20/001 137/596.16
4,903,728 A * 2/1990 Motzer ................. F15B 20/001 137/596.16
4,924,902 A * 5/1990 Lewis ................. F15B 13/0402 137/270
5,481,871 A 1/1996 McFadyen
5,586,570 A * 12/1996 Fukano ............... F15B 13/0402 137/271
5,692,427 A * 12/1997 Yoshida ................ E02F 9/2267 137/596.18

(Continued)

FOREIGN PATENT DOCUMENTS

CN 204186667 3/2015
JP 2001182707 7/2001

*Primary Examiner* — Minh Le
(74) *Attorney, Agent, or Firm* — William R. Tinker

(57) ABSTRACT

A valve assembly is disclosed. The valve assembly includes a valve housing defining a bore, a first valve, and a second valve. The first valve and the second valve are disposed within the bore and each of the first valve and the second valve include a first end and a second end. Further, the first end of the first valve and the first end of the second valve are configured to contact each other. The valve assembly further includes a pilot chamber defined within the bore. The pilot chamber is configured to receive a pilot fluid. Further, a pressure of the pilot fluid inside the pilot chamber is controlled to permit independent movement of the first valve and the second valve within the bore.

16 Claims, 10 Drawing Sheets

(56) References Cited

U.S. PATENT DOCUMENTS

| | | | | |
|---|---|---|---|---|
| 5,791,142 | A | 8/1998 | Layne et al. | |
| 6,026,856 | A * | 2/2000 | Miyazoe | F15B 13/0402<br>137/596.16 |
| 6,598,391 | B2 | 7/2003 | Lunzman et al. | |
| 8,613,292 | B2 * | 12/2013 | Miyazoe | F15B 11/064<br>137/596.14 |
| 9,037,272 | B2 | 5/2015 | Yuan et al. | |
| 2015/0144212 | A1 * | 5/2015 | Matsuo | F15B 13/0402<br>137/596.14 |

* cited by examiner

VALVE ASSEMBLY

TECHNICAL FIELD

The present disclosure relates to a valve assembly. In particular, the present disclosure relates to a pilot operated valve assembly for controlling the flow of a fluid to a plurality of actuators based on a load on the plurality of actuators.

BACKGROUND

Controlling an operation of a hydraulic actuator in a hydraulic circuit is conventionally accomplished using a single spool type valve. The single spool valve controls flow of hydraulic fluid in the hydraulic circuit including a flow of hydraulic fluid from an associated pump to the hydraulic actuator and a flow of hydraulic fluid from the hydraulic actuator to an associated tank. When the hydraulic output device is a hydraulic cylinder, these flows are commonly referred to as pump-to-cylinder flow and cylinder-to-tank flow, respectively.

The hydraulic circuit may include multiple hydraulic actuators. The hydraulic actuators are associated with operation of multiple systems. The hydraulic actuators receive hydraulic fluid from a single pump to operate the systems. The hydraulic circuit may include separate valves for each of the hydraulic actuator associated with each of the system.

Typically, valves include one of pressure compensators or priority based mechanisms to control and provide flow of hydraulic fluid to the hydraulic actuators. The pressure compensators or the priority based mechanisms enable proper flow of hydraulic fluid to the hydraulic actuators based on differential loads acting on the hydraulic actuators. However, the pressure compensators or the priority based mechanisms add to cost of the valves and the hydraulic circuit.

U.S. Pat. No. 4,117,862 discloses a pressure compensated control valve that includes a split spool valve with a common wall to provide a fluid to an actuator. The split spool valve controls opening of associated outlet ports of the valve assembly in response to a load on the actuator, and thereby controls flow of the fluid to the actuator. However, in fluid systems where a single pump delivers the fluid to multiple actuators, the pressure compensated control valve may not efficiently distribute and control the flow of fluid to the multiple actuators, based on differential loads acting on the multiple actuators.

SUMMARY OF THE INVENTION

According to an aspect of the present disclosure, a valve assembly is disclosed. The valve assembly includes a valve housing defining a bore, a first valve, and a second valve. The first valve and the second valve are disposed within the bore and each of the first valve and the second valve include a first end and a second end. Further, the first end of the first valve and the first end of the second valve are configured to contact each other. The valve assembly further includes a pilot chamber defined within the bore and configured to receive a pilot fluid. A pressure of the pilot fluid inside the pilot chamber is controlled to permit independent movement of the first valve and the second valve within the bore.

According to another aspect of the present disclosure, a valve assembly is disclosed. The valve assembly includes a valve housing defining a bore, a first valve, and a second valve. The first valve and the second valve are disposed within the bore and each of the first valve and the second valve include a first end and a second end. Further, the first end of the first valve and the first end of the second valve are configured to contact each other. Also, the second end of the first valve and the second end of the second valve are configured to be acted upon by a pilot fluid. The valve assembly further includes a pilot chamber defined within the bore between the first end of the first valve and the first end of the second valve. The pilot chamber is configured to receive the pilot fluid. Furthermore, the valve assembly is configured to operate in a first mode and a second mode. In the first mode, a pressure of the pilot fluid acting on one of the second end of the first valve and the second end of the second valve is manipulated such that the first valve and the second valve move together within the bore. In the second mode, the pressure of the pilot fluid acting on the second end of the first valve and the second end of the second valve is manipulated such that the first valve and the second valve move independently of each other within the bore.

According to an aspect of the present disclosure, a method for operating a valve assembly is disclosed. The valve assembly includes a valve housing defining a bore, a first valve, and a second valve. The first valve and the second valve are disposed within the bore and configured to contact each other. The method for operating the valve assembly includes controlling pressure of a pilot fluid acting on a first end and a second end of the first valve and a first end and a second end of the second valve for moving the first valve and the second valve within the bore. The method of operating the valve assembly further includes regulating flow of a fluid from one of a first outlet port and a second outlet port by moving the first valve and the second valve within the bore and positioning the first valve and the second valve within the bore.

DETAILED DESCRIPTION

Figure 1:
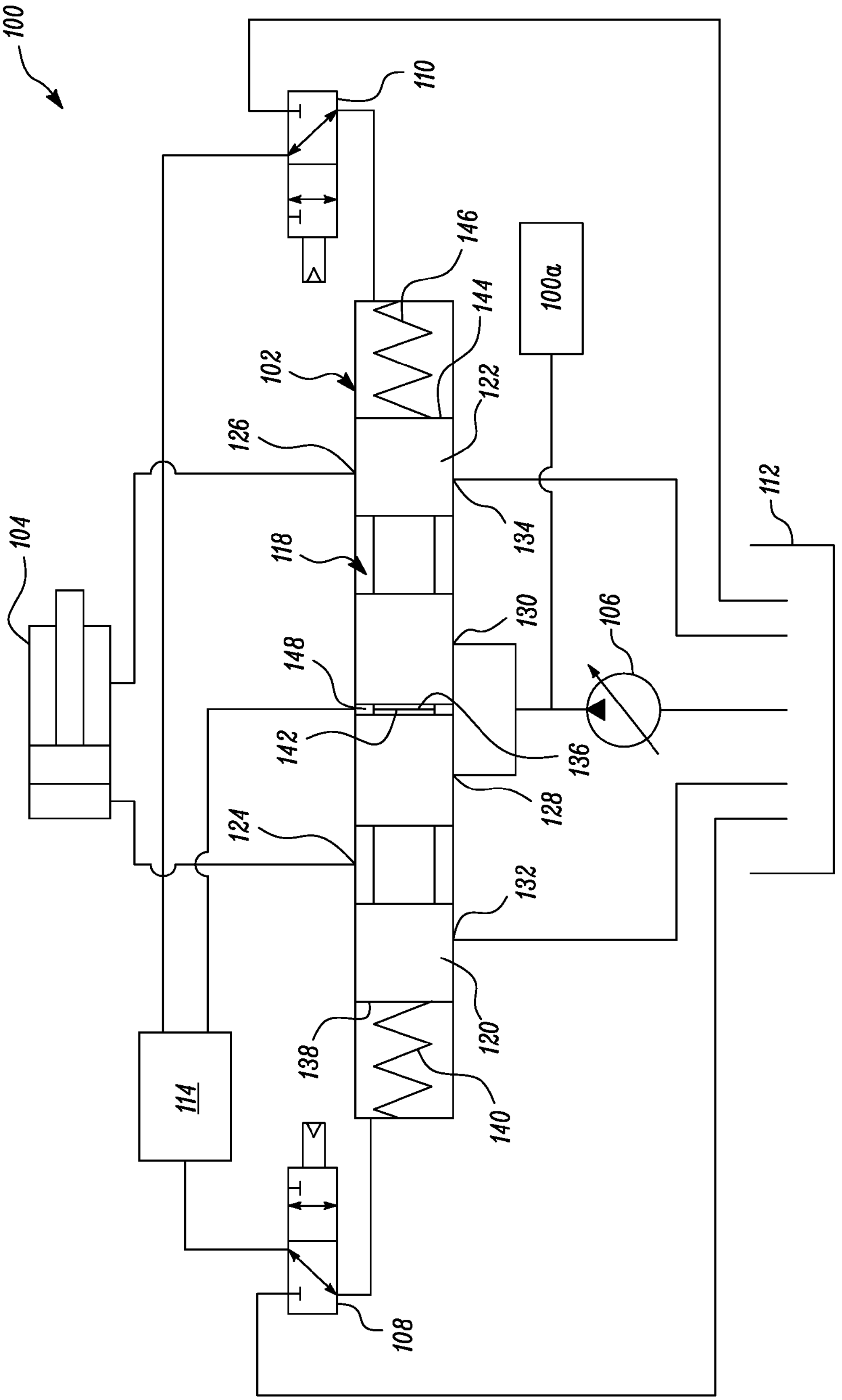
FIG. 1 illustrates a fluid system including a valve assembly, in accordance with an embodiment of the disclosure.

Wherever possible, the same reference numbers will be used throughout the drawings to refer to the same or the like parts. FIG. 1 represents an exemplary fluid system 100 incorporating a valve assembly 102, according to an embodiment of the present disclosure. The fluid system 100 may be configured to manipulate one or more linkages, or any other fluidly powered components or systems of a machine. In an embodiment, the machine may be an excavator, a backhoe loader, a shovel, a wheel loader, etc. The machine may alternatively include any other mining, transportation, forestry, agricultural, construction, or industrial machine.

Referring to FIG. 1, the fluid system 100 includes an actuator 104, a pump 106, a first valve actuator 108, a second valve actuator 110, and a reservoir 112. In an embodiment, the actuator 104 may be operatively connected with a boom or a stick of an excavator and configured to manipulate the boom or the stick. In the illustrated embodiment, the actuator 104 comprises a fluid cylinder. In another embodiment, the actuator 104 may be a fluid motor. The actuator 104 is configured to receive a fluid from the pump 106 and discharge the fluid to the reservoir 112. The pump 106 may be a variable displacement pump or a fixed displacement pump. The pump 106 is also configured to provide fluid to an additional fluid circuit **100*a*. The additional fluid circuit 100*a* may include similar components as that of the fluid system 100**.

Further, the valve assembly 102 is configured to control an amount and direction of flow of the fluid from the pump 106 to the actuator 104 and from the actuator 104 to the reservoir 112. The valve assembly 102 is a pilot operated valve assembly. Further, a pilot circuit 114 is in fluid communication with the valve assembly 102 to actuate and operate the valve assembly 102. Further, the first valve actuator 108 and the second valve actuator 110 are in fluid communication with the valve assembly 102. The first valve actuator 108 and the second valve actuator 110 are configured to control flow of a pilot fluid to the valve assembly 102 for controlling actuation and operation of the valve assembly 102. As shown in FIG. 1, the first valve actuator 108 and the second valve actuator 110 are solenoid-operated valves. Both the first valve actuator 108 and the second valve actuator 110 may be actuated to a first position and a second position. In the first position, the first valve actuator 108 and the second valve actuator 110 fluidly couple the valve assembly 102 to the pilot circuit 114, thereby providing pilot fluid to the valve assembly 102. In the second position, the first valve actuator 108 and the second valve actuator 110 fluidly couple the valve assembly 102 to the reservoir 112, thereby draining the pilot fluid acting on the valve assembly 102 to the reservoir 112.

Figure 2:
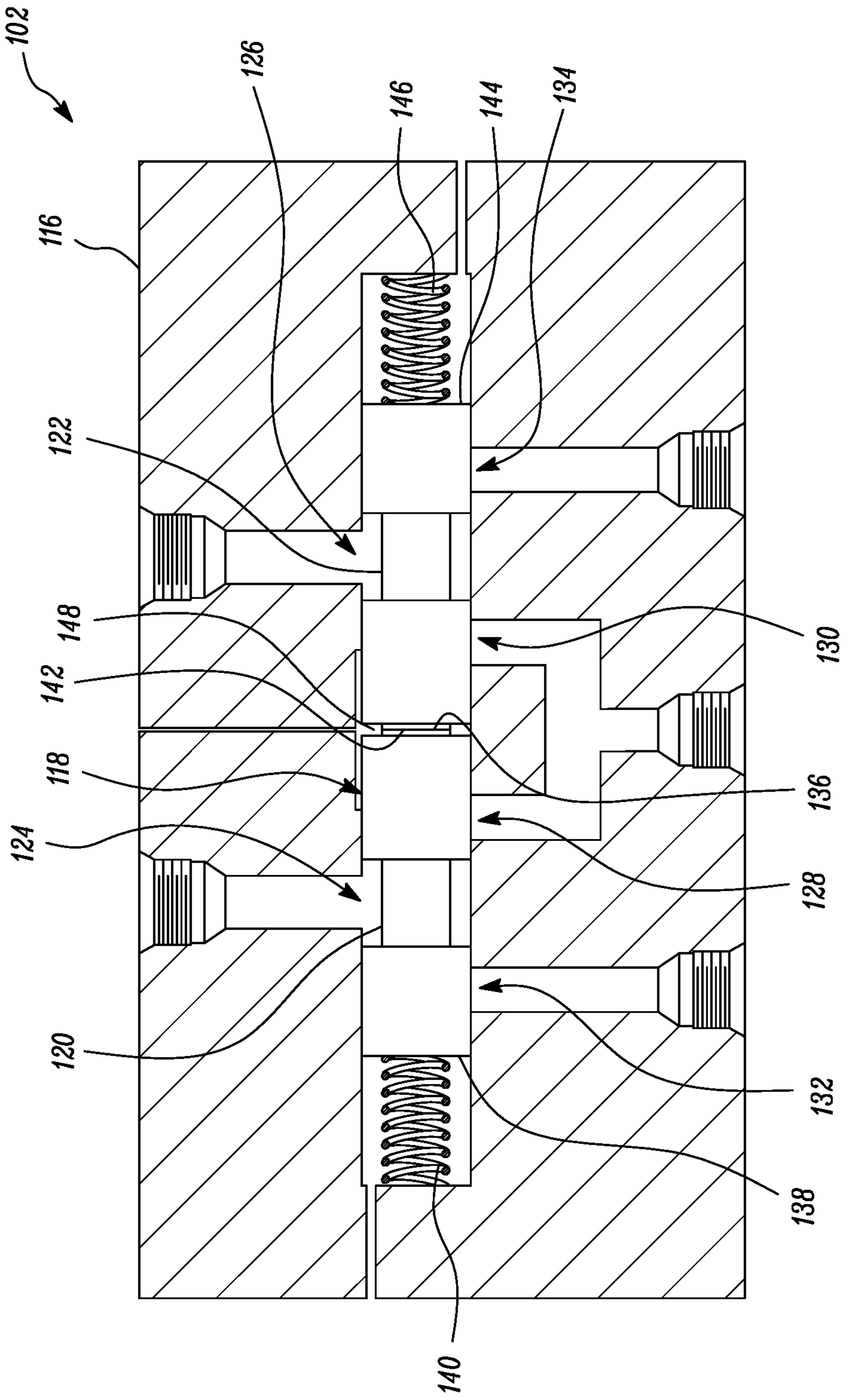
FIG. 2 illustrates a sectional view of the valve assembly depicting positions of a first valve and a second valve in a neutral position, in accordance with an embodiment of the disclosure.

Referring to FIGS. 1, 2, 3, 4, and 5, the valve assembly 102 includes a valve housing 116 defining a bore 118, a first valve 120, a second valve 122, a first outlet port 124, a second outlet port 126, a first inlet port 128, a second inlet port 130, a first drain port 132, and a second drain port 134. The first valve 120 is positioned within the bore 118 and configured to slide within the bore 118. The first valve 120 controls flow of the fluid between the first outlet port 124, the first inlet port 128, and the first drain port 132. The first valve 120 includes a first end 136 and a second end 138. Both the first end 136 and the second end 138 are configured to be acted upon by the pilot fluid for moving the first valve 120 within the bore 118. Further, a first spring 140 may be coupled to the second end 138 to bias the first valve 120 in a neutral position. In the neutral position, the first end 136 of the first valve 120 contacts the second valve 122 (as shown in FIG. 2).

The second valve 122 includes a first end 142 and a second end 144. Both the first end 142 and the second end 144 are configured to be acted upon by the pilot fluid for moving the second valve 122 within the bore 118. The second valve 122 controls flow of the fluid between the second outlet port 126, the second inlet port 130, and the second drain port 134. Further, a second spring 146 coupled to the second end 144 to bias the second valve 122 in a neutral position. In the neutral position, the first end 142 of the second valve 122 contacts the first end 136 of the first valve 120 (as shown in FIG. 2).

Further, the valve assembly 102 includes a pilot chamber 148 defined within the bore 118 configured to receive the pilot fluid. A pressure of the pilot fluid inside the pilot chamber 148 is controlled to permit independent movement of the first valve 120 and the second valve 122 within the bore 118. As shown in FIG. 2, the pilot chamber 148 is defined within the bore 118 between the first end 136 of the first valve 120 and the first end 142 of the second valve 122. The pilot chamber 148 is in fluid communication with the pilot circuit 114 and receives the pilot fluid from the pilot circuit 114. In an embodiment, a valve may be positioned between the pilot circuit 114 and the pilot chamber 148 to control flow of the fluid from the pilot circuit 114 to the pilot chamber 148. The pressure of the pilot fluid acting on the first end 136 and the second end 138 of the first valve 120 and the first end 142 and the second end 144 of the second valve 122 may be controlled to enable movement of the first valve 120 and the second valve 122 within the bore 118.

In the neutral position (as shown in FIG. 2), the valve assembly 102 is configured to block flow of the fluid between the pump 106 and the actuator 104, and between the actuator 104 and the reservoir 112. As shown in FIG. 2, in the neutral position, the first valve 120 contacts the second valve 122. Further, in the neutral position, the pressure of the pilot fluid acting on the first end 136 and the second end 138 of the first valve 120 and the first end 142 and the second end 144 of the second valve 122 may be a maximum pressure of the pilot fluid. With the pilot fluid acting on the first end 136 and the second end 138 of the first valve 120, and the first end 142 and the second end 144 of the second valve 122, both the first spring 140 and the second spring 146 force the first valve 120 and the second valve 122 to a center position. As shown in FIG. 2, in the neutral position, the first valve 120 is positioned within the bore 118 such that the first valve 120 closes the first inlet port 128 and the first drain port 132. Similarly, the second valve 122 is positioned within the bore 118 such that the second valve 122 closes the second inlet port 130 and the second drain port 134.

Further, the valve assembly 102 is configured to move from the neutral position to allow flow of the fluid from the pump 106 to the actuator 104 and from the actuator 104 to the reservoir 112. The valve assembly 102 is configured to operate in a first mode and a second mode. In the first mode, the first valve 120 and the second valve 122 contact each other and move together within the bore 118. In the second mode, the first valve 120 and the second valve 122 are spaced from each other within the bore 118 and move independently of each other. The valve assembly 102 is operated in the second mode to control an opening of the first inlet port 128 or the second inlet port 130 to provide a controlled flow to the actuator 104 from the pump 106.

Figure 3:
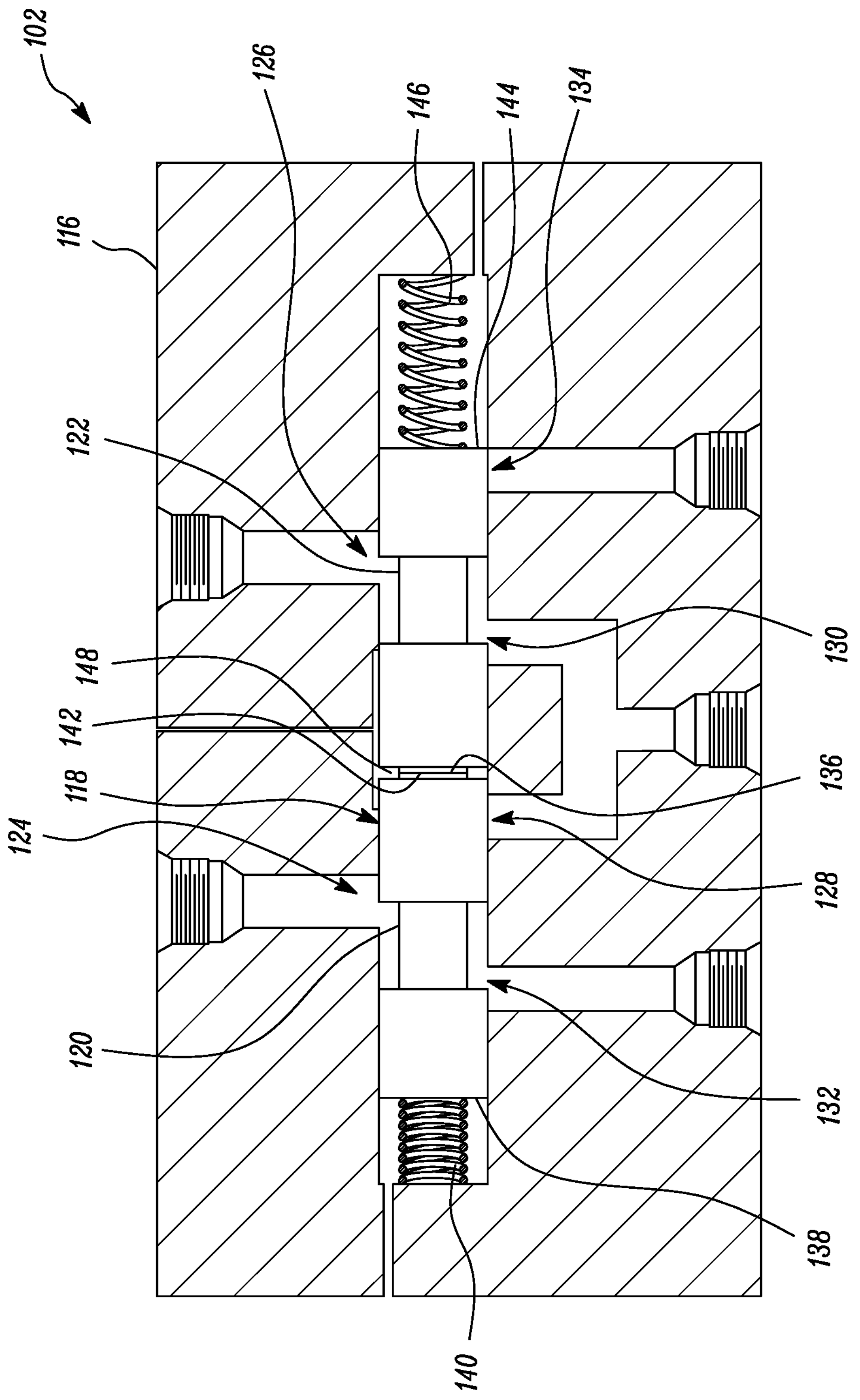
FIG. 3 illustrates a sectional view of the valve assembly depicting positions of the first valve and the second valve in a first mode, in accordance with an embodiment of the disclosure.

The valve assembly 102 may be operated in the first mode by reducing the pressure of the pilot fluid acting either on the second end 138 of the first valve 120 or on the second end 144 of the second valve 122. In an embodiment, when flow of the fluid from the pump 106 to the actuator 104 is required through the second outlet port 126, the pressure of the pilot fluid acting on the second end 138 of the first valve 120 is reduced. The pressure of the pilot fluid acting on the second end 138 of the first valve 120 may be reduced by actuating the first valve actuator 108 to the second position. The actuation of the first valve actuator 108 in the second position allows the pilot fluid acting on the second end 138 of the first valve 120 to be drained to the reservoir 112. Further, the pressure of the pilot fluid in the pilot chamber 148 and the pressure of the pilot fluid acting on the second end 144 of the second valve 122 is kept unchanged. Therefore, the reduction of the pressure of the pilot fluid acting on the second end 138 of the first valve 120 causes, the first valve 120 and the second valve 122 to move together within the bore 118. This allows positioning of the second valve 122 within the bore 118 such that the second inlet port 130 and the second outlet port 126 are opened and fluidly coupled to each other (as shown in FIG. 3). In so doing, the pump 106 provides fluid to the actuator 104 via the second outlet port 126. Similarly, when flow of the fluid to the actuator 104 from the pump 106 is required via the first outlet port 124, the pressure of the pilot fluid acting on the second end 144 of the second valve 122 is reduced by actuating the second valve actuator 110 in the second position.

Further, the valve assembly 102 may be operated in the second mode by manipulating the pressure of the pilot fluid acting on the second end 138 of the first valve 120 and the second end 144 of the second valve 122. In the second mode, the first valve 120 and the second valve 122 is configured to move independent of each other within the bore 118 to regulate and reduce flow of the fluid to the actuator 104 from the pump 106. Flow of the fluid from the pump 106 to the actuator 104 is reduced by either reducing the opening of the first inlet port 128 or the opening of the second inlet port 130. The reduction in the opening of the first inlet port 128 or the opening of the second inlet port 130 may be achieved by sliding and thereby suitably positioning the first valve 120 and/or the second valve 122 inside the bore 118. In the second mode, the movement and positioning of the first valve 120 and/or the second valve 122 within the bore 118 is controlled by controlling the pressure of the pilot fluid acting on the second end 138 and/or the second end 144.

Figure 4:
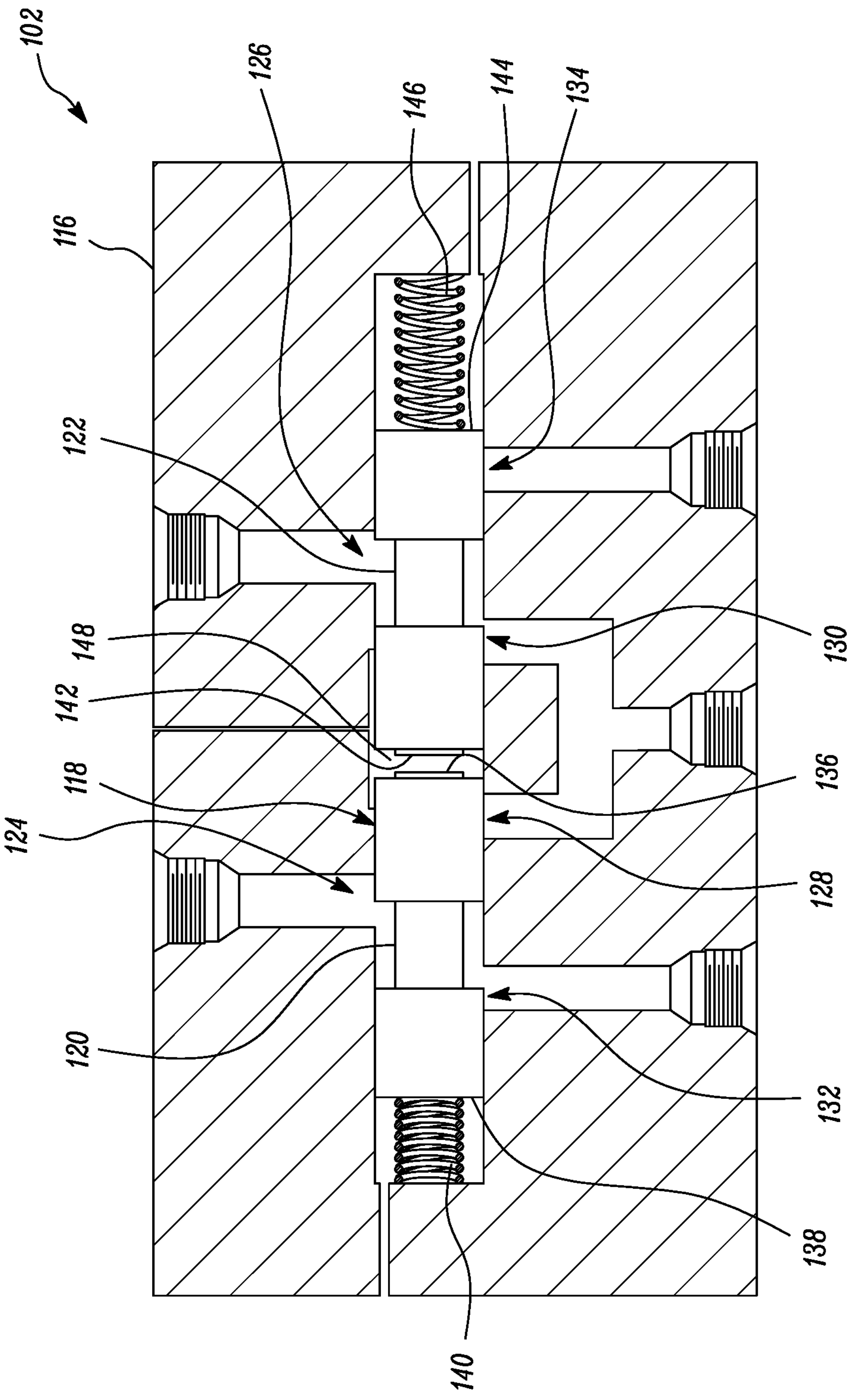
FIG. 4 illustrates a sectional view of the valve assembly depicting positions of the first valve and the second valve in a second mode, in accordance with an embodiment of the disclosure.

In an embodiment, as shown in FIG. 4, to reduce flow of the fluid through the second outlet port 126, the second valve 122 is positioned such that the second inlet port 130 is partially opened. This is achieved by first reducing the pressure of the pilot fluid acting on the second end 138 of the first valve 120 and thereby moving the first valve 120 and the second valve 122 within the bore 118 such that the first spring 140 is compressed and the second spring 146 is extended. Thereafter, the pressure of the pilot fluid acting on the second end 144 of the second valve 122 is reduced by actuating the second valve actuator 110 to the second position. This allows retraction of the second spring 146, thereby moving the second valve 122 within the bore 118 such that the second inlet port 130 is partially opened. Once the second valve 122 is suitably positioned within the bore 118, the second valve actuator 110 is actuated to the first position, thereby stopping the movement of the second valve 122 within the bore 118.

In an embodiment, a first position sensor (not shown) may be used to determine the position of the second valve 122 within the bore 118. The first position sensor may be a linear voltage differential transformer based sensor, a hydro-mechanical feedback device, or any other suitable position sensor known in the art.

Similarly, when the reduced flow is required through the first outlet port 124, the first valve 120 and the second valve 122 are moved within the bore 118 by reducing the pressure of the pilot fluid acting on the second end 144 of second valve 122, at first. Thereafter, the pressure of the pilot fluid acting on the second end 138 of the first valve 120 is reduced by actuating the first valve actuator 108 to the second position. Thereafter, the first valve actuator 108 may be actuated to the first position based on a position of the first valve 120 within the bore 118 such that the first valve 120 partially opens the first inlet port 128.

In an embodiment, the position of the first valve 120 within the bore 118 may be monitored by a second position sensor. The second position sensor may be a linear voltage differential transformer based sensor, a hydro-mechanical feedback device, or any other suitable position sensor known in the art.

Figure 5:
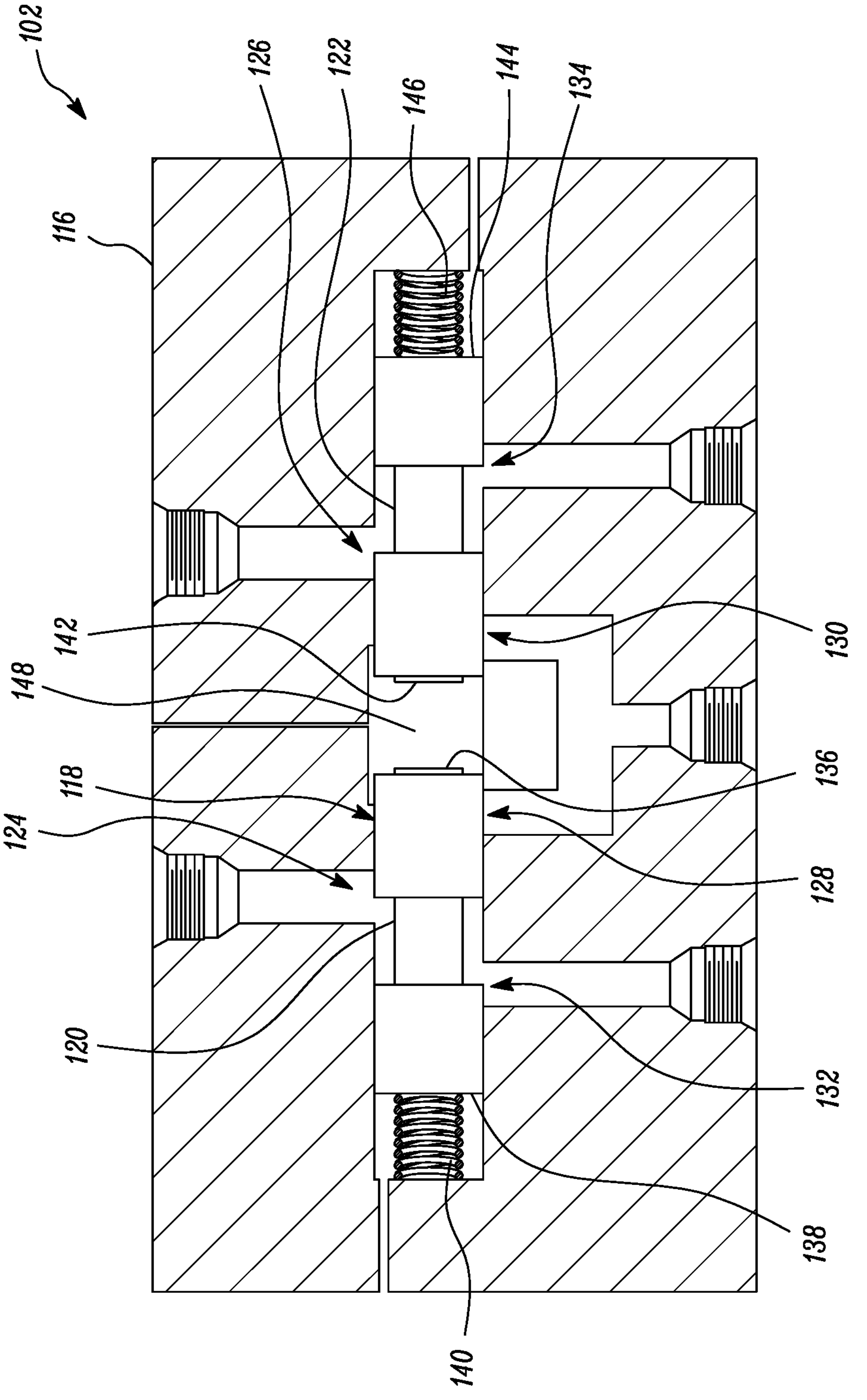
FIG. 5 illustrates a sectional view of the valve assembly depicting positions of the first valve and the second valve in a floating position, in accordance with an embodiment of the disclosure.
Figure 6:
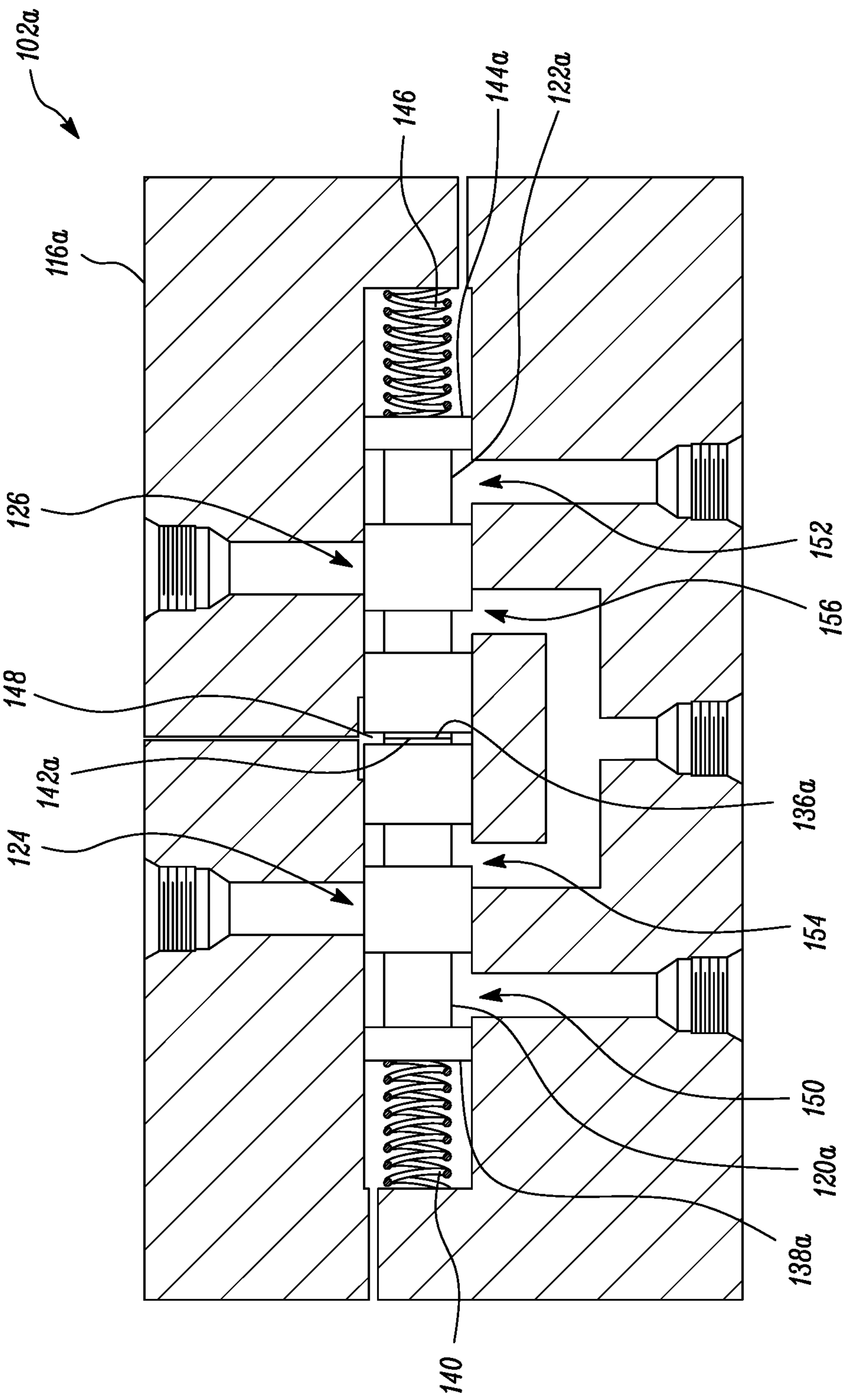
FIG. 6 illustrates a sectional view of a valve assembly depicting positions of a first valve and a second valve in a neutral position, in accordance with an alternative embodiment of the disclosure.

Referring to FIG. 5, a floating position of the valve assembly 102 is shown. In the floating position, the first valve 120 and the second valve 122 is positioned within the bore 118 such that the first outlet port 124, the second outlet port 126, the first drain port 132, and the second drain port 134 are in opened state. Therefore, in the floating position, the first outlet port 124 is in fluid communication with the first drain port 132 and the second outlet port 126 is in fluid communication with the second drain port 134. As shown in FIG. 5, in the floating position, the first inlet port 128 and the second inlet port 130 are in closed state. The valve assembly 102 may be actuated in the floating position by reducing the pressure of the pilot fluid acting on the second end 138 of the first valve 120 and the second end 144 of the second valve 122. The reduction in the pressure of the pilot fluid may be achieved by actuating the first valve actuator 108 and the second valve actuator 110 in the second position.

Referring to FIGS. 6, 7, 8, and 9, a valve assembly **102*a* is shown according to an alternative embodiment of the disclosure. The valve assembly 102*a* includes a valve housing 116*a* defining the bore 118, a first valve 120*a*, a second valve 122*a*, the first outlet port 124, the second outlet port 126, a first inlet port 150, a second inlet port 152, a first drain port 154, and a second drain port 156. In the present embodiment, the first drain port 154 and the second drain port 156 are positioned between the first inlet port 150 and the second inlet port 152**.

The first valve **120*a* and the second valve 122*a* are disposed within the bore 118. The valve assembly 102*a* further includes the pilot chamber 148 defined within the bore 118 between a first end 136*a* of the first valve 120*a* and a first end 142*a* of the second valve 122*a*. Further, a second end 138*a* of the first valve 120*a* may be coupled to the first spring 140 and a second end 144*a* of the second valve 122*a* may be coupled to the second spring 146. The first spring 140 and the second spring 146, respectively bias the first valve 120*a* and the second valve 122*a* in a neutral position (shown in FIG. 6). In the neutral position, the first outlet port 124 and the second outlet port 126 are closed, while the first inlet port 150, the second inlet port 152, the first drain port 154, and the second drain port 156, are opened. Further, in the neutral position, the first end 136***a* of the first valve 120*a* and the first end 142*a* of the second valve 122*a* contact each other.

Further, the valve assembly 102*a* is configured to be operated in a first mode and a second mode by controlling the pressure of the pilot fluid acting on the first end 136*a* and the second end 138*a* of the first valve 120*a*, and the first end 142*a* and the second end 144*a* of the second valve 122*a*. The valve assembly 102*a* is operated in the first mode and in the second mode in a similar manner as described earlier in conjunction with the valve assembly 102.

Figure 7:
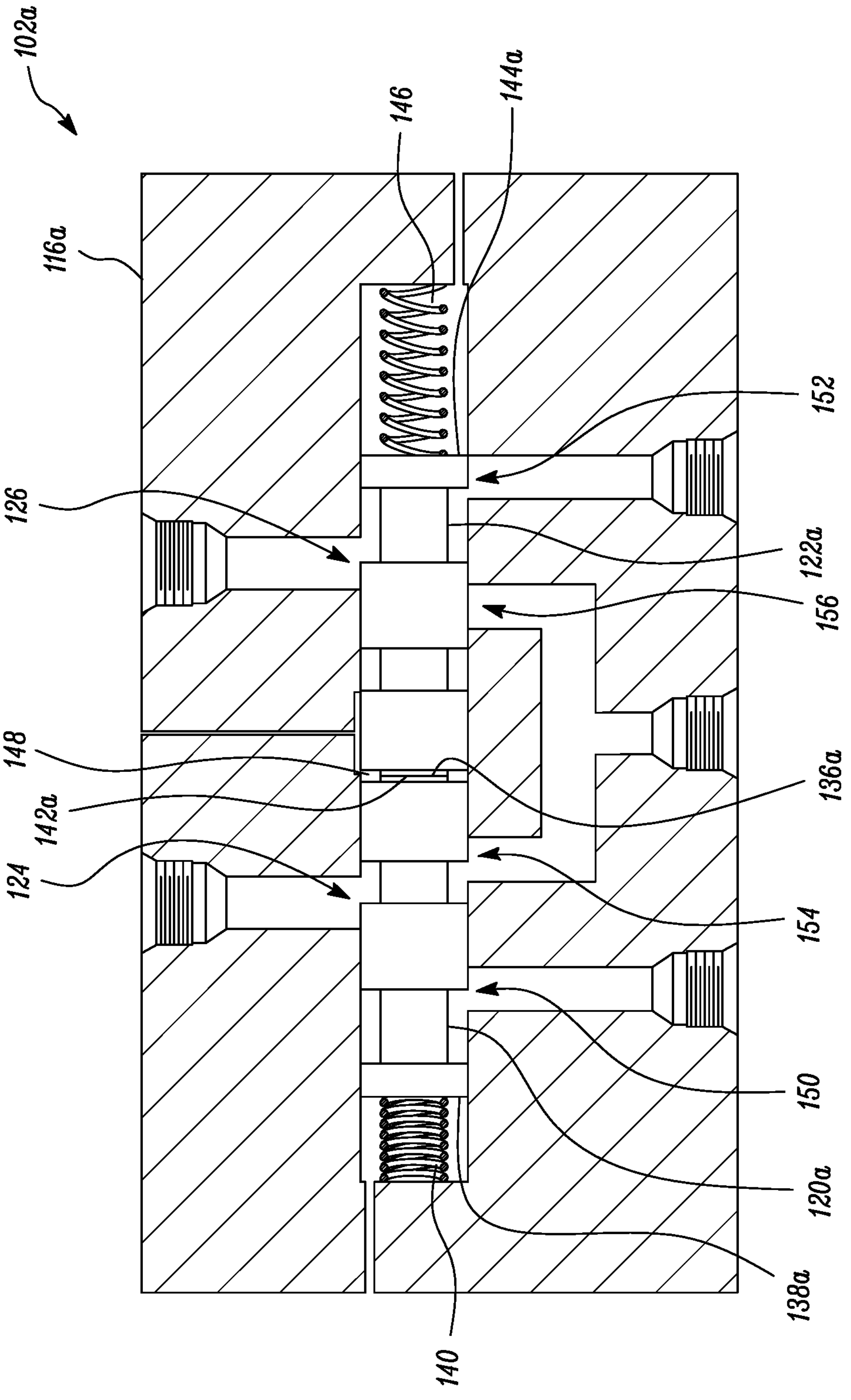
FIG. 7 illustrates a sectional view of the valve assembly depicting positions of the first valve and the second valve in a first mode, in accordance with an alternative embodiment of the disclosure.

In the first mode, the first valve 120*a* and the second valve 122*a* contact each other and move together within the bore 118 (shown in FIG. 7). In the first mode, the first valve actuator 108 or the second valve actuator 110 is controlled, in a similar manner as described earlier with respect to the valve assembly 102, to reduce the pressure of the pilot fluid acting on either the second end 138*a* of the first valve 120*a* or the second end 144*a* of the second valve 122*a*.

Figure 8:
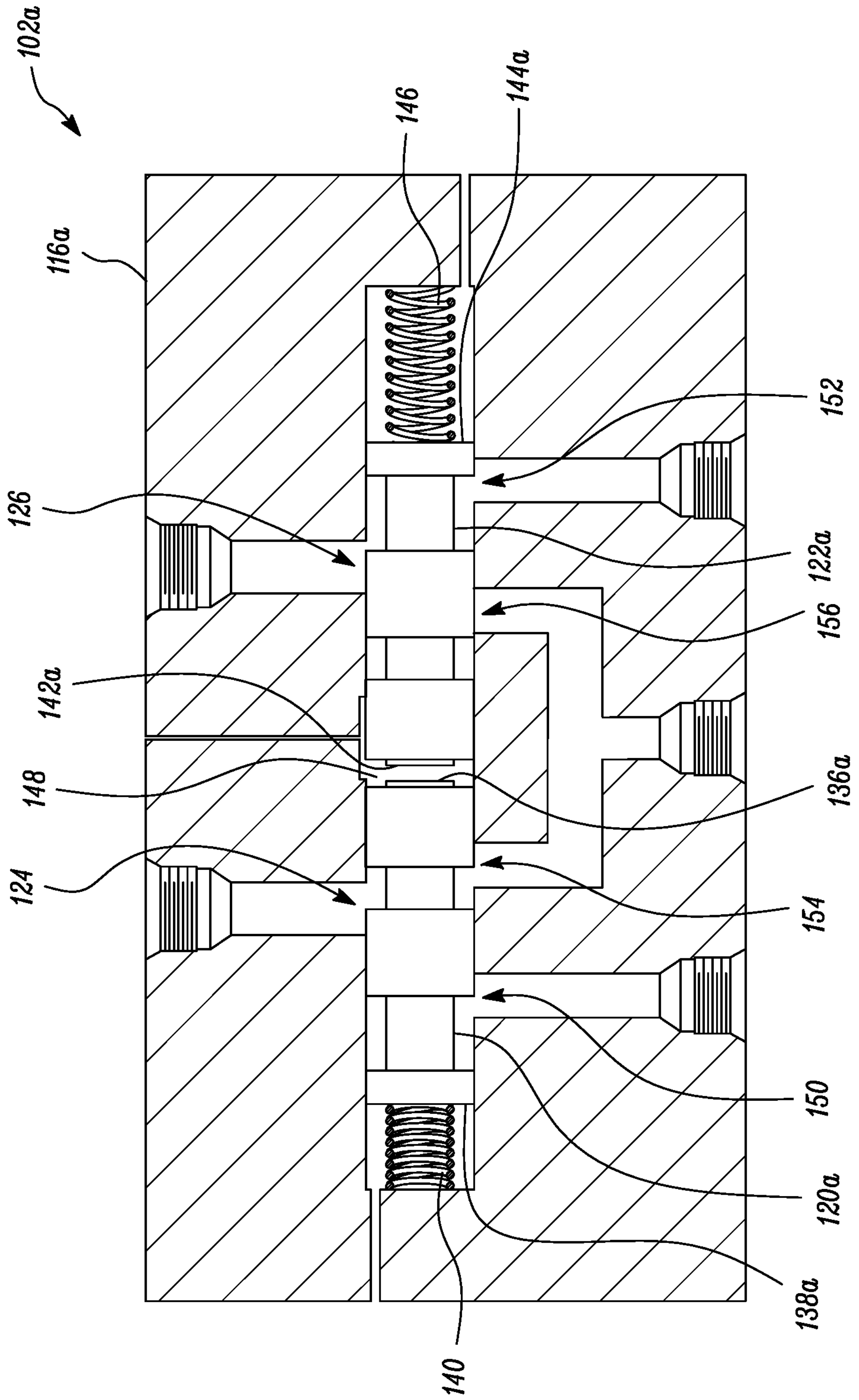
FIG. 8 illustrates a sectional view of the valve assembly depicting positions of the first valve and the second valve in a second mode, in accordance with an alternative embodiment of the disclosure.

In the second mode, the valve assembly 102*a* is configured to provide a reduced flow of the fluid to the actuator 104 though the first outlet port 124 or the second outlet port 126. In the second mode, the first valve 120*a* and/or the second valve 122*a* is positioned within the bore 118 such that the either the first outlet port 124 or the second outlet port 126 is partially opened to reduce flow of the fluid to the actuator 104. The positioning of the first valve 120*a* and/or the second valve 122*a* is performed by reducing the pressure of the pilot fluid acting on the second end 138*a* of the first valve 120*a* and the second end 144*a* of the second valve 122*a* in a similar manner as described earlier in reference to the actuation of the valve assembly 102 in the second mode. As shown in FIG. 8, in the second mode, the second valve 122*a* moved and positioned within the bore 118 so as to partially open the second outlet port 126 to reduce flow of the fluid through the second outlet port 126.

Figure 9:
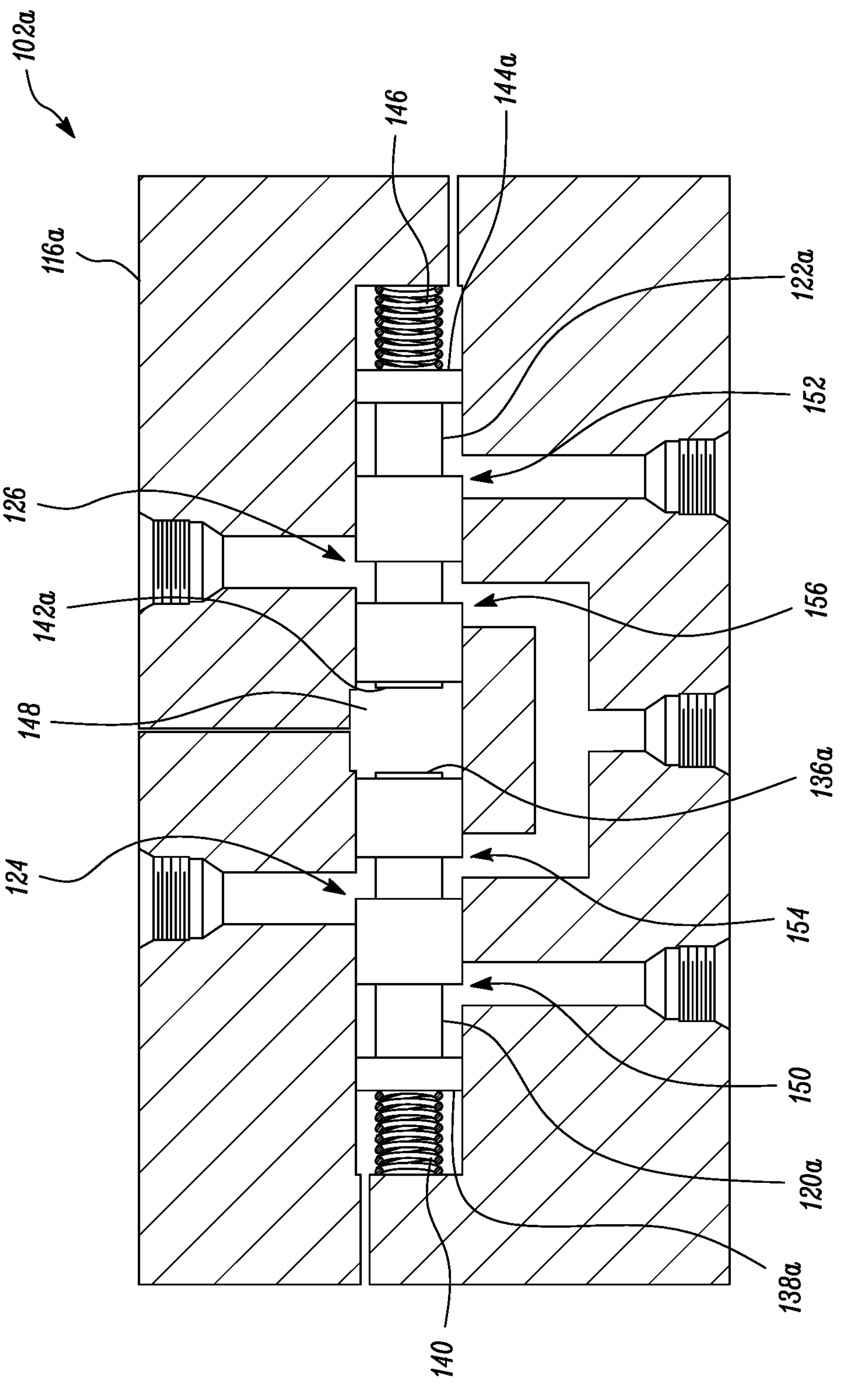
FIG. 9 illustrates a sectional view of the valve assembly depicting positions of the first valve and the second valve in a floating position, in accordance with an alternative embodiment of the disclosure.

Referring to FIG. 9, a floating position of the valve assembly 102*a* is shown. In this floating position, the first valve 120*a* and the second valve 122*a* is positioned within the bore 118 such that the first outlet port 124, the second outlet port 126, the first drain port 154, and the second drain port 156 are in opened state. Therefore, in the floating position, the first outlet port 124 is in fluid communication with the first drain port 154 and the second outlet port 126 is in fluid communication with the second drain port 156. The valve assembly 102*a* may be actuated in the floating position by reducing the pressure of the pilot fluid acting on the second end 138*a* of the first valve 120*a* and the second end 144*a* of the second valve 122*a*. The reduction in the pressure of the pilot fluid may be achieved by actuating the first valve actuator 108 and the second valve actuator 110 in the second position.

INDUSTRIAL APPLICABILITY

Figure 10:
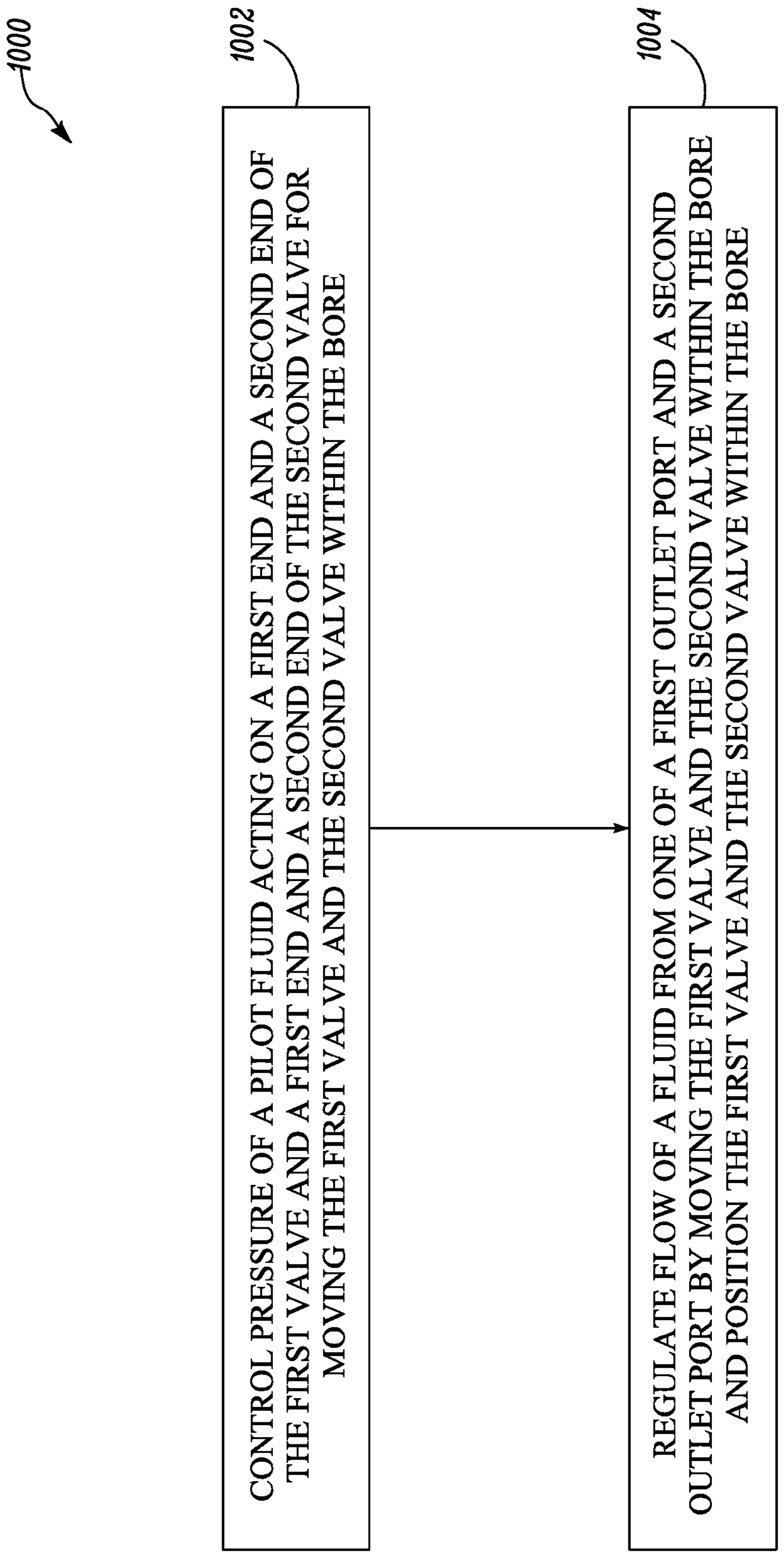
FIG. 10 illustrates a method for operating the valve assembly, in accordance with an embodiment of the disclosure.

Referring to FIG. 10, a method 1000 for operating any one of the valve assembly 102 and the valve assembly 102*a* is provided. Although the method 1000 is explained in conjunction with the valve assembly 102, it may be understood that the valve assembly 102*a* may be operated in a similar manner. Further, the references will be made to FIGS. 1-9 for describing the method 1000 in detail.

The method 1000 includes a step 1002 for controlling the pressure of the pilot fluid acting on the first end 136 and the second end 138 of the first valve 120, and the first end 142 and the second end 144 of the second valve 122, to enable movement of the first valve 120 and the second valve 122 within the bore 118. The pressure of the pilot fluid acting on the second end 138 and second end 144 may be controlled by respectively controlling the first valve actuator 108 and the second valve actuator 110. In an embodiment, the pressure of the pilot fluid acting on one of the second end 138 of the first valve 120 and the second end 144 of the second valve 122 may be reduced to move the first valve 120 and the second valve 122 together within the bore 118. The pressure of the pilot fluid acting on either the second end 138 or the second end 144 may be reduced to actuate and operate the valve assembly 102 in the first mode.

Further, the pressure of the pilot fluid acting on the second end 138 of the first valve 120 and the second end 144 of the second valve 122 may be reduced to move the first valve 120 and the second valve 122 independently within the bore 118. The pressure of the pilot fluid acting of the second 138 and the second end 144 may be reduced to actuate and operate the valve assembly 102 in the second mode. The pressure of the pilot fluid acting on the second end 138 may be reduced by positioning the first valve actuator 108 in the second position. Similarly, the pressure of the pilot fluid acting on the second end 144 may be reduced by actuating the second valve actuator 110 in the second position.

The method 1000 further includes a step 1004 for regulating flow of the fluid through the first outlet port 124 or the second outlet port 126 by moving the first valve 120 and the second valve 122 within the bore 118. The first valve 120 and the second valve 122 may be moved to suitably position the first valve 120 and the second valve 122 such that flow of the fluid through the first outlet port 124 or the second outlet port 126 is regulated. In an embodiment, the first valve 120 and the second valve 122 is moved and positioned within the bore 118 such that the first inlet port 128 or the second inlet port 130 is partially opened so as to restrict flow of the fluid respectively through the first outlet port 124 or the second outlet port 126. To partially open either of the first inlet port 128 or the second inlet port 130, the valve assembly 102 operates in the second mode.

Further, an operation of the fluid system 100 having the valve assembly 102 is disclosed. Although the operation of the fluid system 100 is explained in conjunction with the valve assembly 102, it may be understood that fluid system 100 having the valve assembly 102*a* may be operated in a similar manner.

In operation, the pump 106 provides flow of the fluid to the actuator 104 via the valve assembly 102. When there is requirement to solely actuate the actuator 104, the valve assembly 102 operates in the first mode. For actuating the valve assembly 102 in the first mode, a controller may actuate either the first valve actuator 108 or the second valve actuator 110 to the second position, thereby reducing the pressure of the pilot fluid acting on the second end 138 or the second end 144 by draining the pilot fluid to the reservoir 112.

When the pump 106 provides flow of the fluid to both the actuator 104 and the additional fluid circuit 100*a* which has a higher load as compared to the actuator 104, the valve assembly 102 operates in the second mode. For this purpose, the controller actuates both the first valve actuator 108 and the second valve actuator 110 to the second position. This allows a restricted flow of the fluid to the actuator 104 from the pump 106 and relatively more flow of the fluid to the additional fluid circuit 100*a*.

Therefore, the disclosed valve assembly directs a flow of the fluid to systems or circuits based on loads acting on fluid systems or circuits, when a single pump provides flow of the fluid to actuate multiple systems of a machine. Therefore, additional components such as a pressure compensator valve may be removed from such fluid systems or circuits connected to a single pump. This helps in reducing the cost and overall size of the valve assembly and the fluid system.

What is claimed is:

1. A valve assembly comprising:

a valve housing defining a bore;

a first valve disposed within the bore, the first valve including a first end and a second end, the second end of the first valve configured to be acted upon by a pilot fluid from a pilot circuit;

a second valve disposed within the bore, the second valve including a first end and a second end, the second end of the second valve configured to be acted upon by the pilot fluid from the pilot circuit; and a pilot chamber defined within the bore between the first end of the first valve and the first end of the second valve and configured to receive the pilot fluid from the pilot circuit, wherein a pressure of the pilot fluid inside the pilot chamber acting on the first end of the first valve and the first end of the second valve, a pressure of the pilot fluid acting on the second end of the first valve, and a pressure of the pilot fluid acting on the second end of the second valve are controlled such that the first valve and the second valve move together within the bore in a first mode of operation of the valve assembly, and such that the first end of the first valve and the first end of the second valve are spaced from each other to permit independent movement of the first valve and the second valve within the bore in at least a second mode of operation of the valve assembly.

2. The valve assembly of claim 1 further comprising:

a first spring coupled to the second end of the first valve; and a second spring coupled to the second end of the second valve, wherein the first spring and the second spring are configured to bias the first valve and the second valve such that the first end of the first valve and the first end of the second valve contact each other in a neutral position, respectively.

3. The valve assembly of claim 1 further comprising a first outlet port and a second outlet port to facilitate discharge of a fluid from the valve assembly.

4. The valve assembly of claim 3, wherein the first valve and the second valve are configured to control flow of the fluid through the first outlet port and the second outlet port, respectively.

5. A fluid system comprising the valve assembly as recited in claim 1.

6. The valve assembly of claim 1, wherein in a neutral position of the valve assembly, each of the pressure of the pilot fluid inside the pilot chamber acting on the first end of the first valve and the first end of the second valve, the pressure of the pilot fluid acting on the second end of the first valve, and the pressure of the pilot fluid acting on the second end of the second valve is a maximum pressure of the pilot fluid such that each of a first spring coupled to the second end of the first valve and a second spring coupled to the second end of the second valve force the first end of the first valve into contact with the first end of the second valve.

7. The valve assembly of claim 6, wherein in the neutral position of the valve assembly, the first valve is positioned within the bore such that the first valve closes a first inlet port defined in the valve housing, and the second valve is positioned within the bore such that the second valve closes a second inlet port defined in the valve housing.

8. The valve assembly of claim 1, wherein in the first mode of operation of the valve assembly, the pressure of the pilot fluid from the pilot circuit acting on one of the second end of the first valve and the second end of the second valve is reduced in comparison to the pressure of the pilot fluid inside the pilot chamber acting on the first end of the first valve and the first end of the second valve such that the first valve and the second valve move together within the bore.

9. The valve assembly of claim 1, wherein in the second mode of operation of the valve assembly, the pressure of the pilot fluid from the pilot circuit acting on one of the second end of the first valve and the second end of the second valve is reduced in comparison to the pressure of the pilot fluid inside the pilot chamber acting on the first end of the first valve and the first end of the second valve, and the pressure of the pilot fluid from the pilot circuit acting on the other of the second end of the first valve and the second end of the second valve is reduced in comparison to the pressure of the pilot fluid inside the pilot chamber acting on the first end of the first valve and the first end of the second valve such that one of the first valve and the second valve is positioned within the bore to reduce an opening of one of a first inlet port and a second inlet port defined within the valve housing such that the reduced opening of the one of the first inlet port and the second inlet port is partially opened.

10. The valve assembly of claim 9, wherein in the second mode of operation of the valve assembly, the pressure of the pilot fluid from the pilot circuit acting on one of the second end of the first valve and the second end of the second valve and the pressure of the pilot fluid from the pilot circuit acting on the other of the second end of the first valve and the second end of the second valve are sequentially reduced such that the pressure of the pilot fluid from the pilot circuit acting on the one of the second end of the first valve and the second end of the second valve is reduced prior to reducing the pressure of the pilot fluid from the pilot circuit acting on the other of the second end of the first valve and the second end of the second valve.

11. A valve assembly comprising:

a valve housing defining a bore, a first outlet port, a second outlet port, a first inlet port, a second inlet port, a first drain port, and a second drain port;

a first valve disposed within the bore between the first outlet port, the first inlet port, and the first drain port, the first valve including a first end and a second end;

a second valve disposed within the bore between the second outlet port, the second inlet port, and the second drain port, the second valve including a first end and a second end;

a pilot chamber defined within the bore between the first end of the first valve and the first end of the second valve and configured to receive a pilot fluid from a pilot circuit;

the first end and the second end of the first valve configured to be acted upon by the pilot fluid from the pilot circuit for moving the first valve within the bore to control a flow of fluid between the first outlet port, the first inlet port, and the first drain port;

the first end and the second end of the second valve configured to be acted upon by the pilot fluid from the pilot circuit for moving the second valve within the bore to control a flow of fluid between the second outlet port, the second inlet port, and the second drain port;

the first end of the first valve and the first end of the second valve are configured to contact each other in a neutral position;

wherein the valve assembly is configured to operate in a first mode and a second mode, wherein in the first mode, a pressure of the pilot fluid from the pilot circuit acting on one of the second end of the first valve and the second end of the second valve is reduced in comparison to the pressure of the pilot fluid in the pilot chamber such that the first valve and the second valve move together within the bore, and in the second mode, the pressure of the pilot fluid from the pilot circuit acting on one of the second end of the first valve and the second end of the second valve is reduced in comparison to the pressure of the pilot fluid in the pilot chamber, and the pressure of the pilot fluid from the pilot circuit acting on the other of the second end of the first valve and the second end of the second valve is reduced in comparison to the pressure of the pilot fluid in the pilot chamber such that the first valve and the second valve move independently of each other within the bore.

12. The valve assembly of claim 11, wherein in the second mode, the pressure of the pilot fluid from the pilot circuit acting on the one of the second end of the first valve and the second end of the second valve and the pressure of the pilot fluid from the pilot circuit acting on the other of the second end of the first valve and the second end of the second valve are sequentially reduced in comparison to the pressure of the pilot fluid in the pilot chamber.

13. The valve assembly of claim 12, wherein in the second mode of operation of the valve assembly the first valve and the second valve move independently of each other within the bore such that one of the first valve and the second valve is positioned within the bore to reduce an opening of one of the first inlet port and the second inlet port such that the reduced opening of the one of the first inlet port and the second inlet port is partially opened.

14. The valve assembly of claim 11 further comprising:

a first spring coupled to the second end of the first valve; and a second spring coupled to the second end of the second valve, wherein the first spring and the second spring are configured to bias the first valve and the second valve in the neutral position, respectively.

15. A fluid system comprising the valve assembly as recited in claim 11, the fluid system including an actuator, a pump, and a reservoir, wherein the valve assembly is configured to control an amount and a direction of flow from the pump to the actuator and from the actuator to the reservoir, wherein the fluid system further includes the pilot circuit including a first valve actuator and a second valve actuator, the first valve actuator in fluid communication and configured to be actuated to control the pressure of the pilot fluid from the pilot circuit acting on the second end of the first valve and the second valve actuator in fluid communication and configured to be actuated to control the pressure of the pilot fluid from the pilot circuit acting on the second end of the second valve.

16. The valve assembly of claim 11, wherein in the neutral position of the valve assembly, the first valve is positioned within the bore such that the first valve closes the first inlet port and the first drain port and the second valve is positioned within the bore such that the second valve closes the second inlet port and the second drain port.

* * * * *